United States Patent [19]

Shettleroe

[11] Patent Number: 4,862,614
[45] Date of Patent: Sep. 5, 1989

[54] MAP HOLDER

[76] Inventor: Jerry Shettleroe, 2100 Macquillen Rd., Port St. Lucie, Fla. 34952

[21] Appl. No.: 155,105

[22] Filed: Feb. 11, 1988

[51] Int. Cl.$^4$ ............................................. G09F 21/04
[52] U.S. Cl. ......................................... 40/593; 40/518; 40/471; 40/904
[58] Field of Search .................. 40/518, 471, 593, 155, 40/517, 603, 610, 904; 160/DIG. 3; D20/21

[56] References Cited

U.S. PATENT DOCUMENTS

| | | | |
|---|---|---|---|
| 1,329,875 | 2/1920 | Allen | 40/518 |
| 1,346,691 | 7/1920 | Babcock | 40/155 |
| 1,583,720 | 5/1926 | Jacobs | 40/155 |
| 1,760,785 | 5/1930 | Sledge et al. | 40/518 |
| 2,127,997 | 8/1938 | Hoston et al. | 40/518 |
| 3,325,933 | 6/1967 | Rizzo et al. | 40/518 |
| 4,136,472 | 1/1979 | Delvo | 40/518 |

Primary Examiner—John Weiss
Assistant Examiner—J. Hakomaki
Attorney, Agent, or Firm—Leon Gilden

[57] ABSTRACT

A portable telescopingly collapsible map holder apparatus is set forth. An upper casing rotatably secures a first end of a secured map wherein a lower casing rotatably secures the other end of said map. The included map between the casings is selectively rotatably positionable, either manually or by electric motors, to present various portions of the included map between the upper and lower casings. An adapter engageable into a conventional automotive cigarette lighter socket is utilized for providing power for the motors secured within the upper and lower casings. The map holder apparatus has included suction means for securement of the apparatus to and automotive window to provide light for enhanced illumination of the included map.

1 Claim, 4 Drawing Sheets

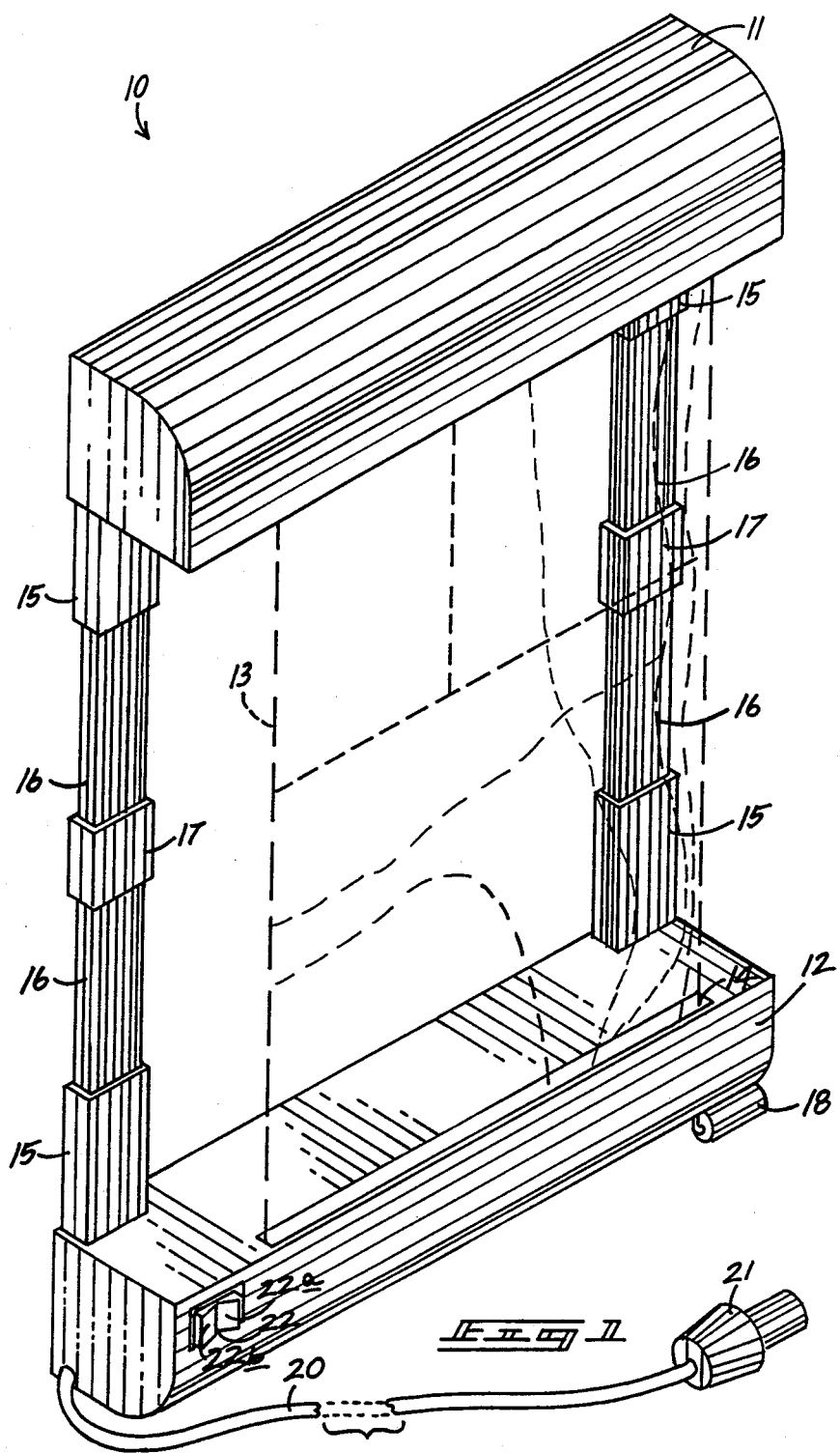

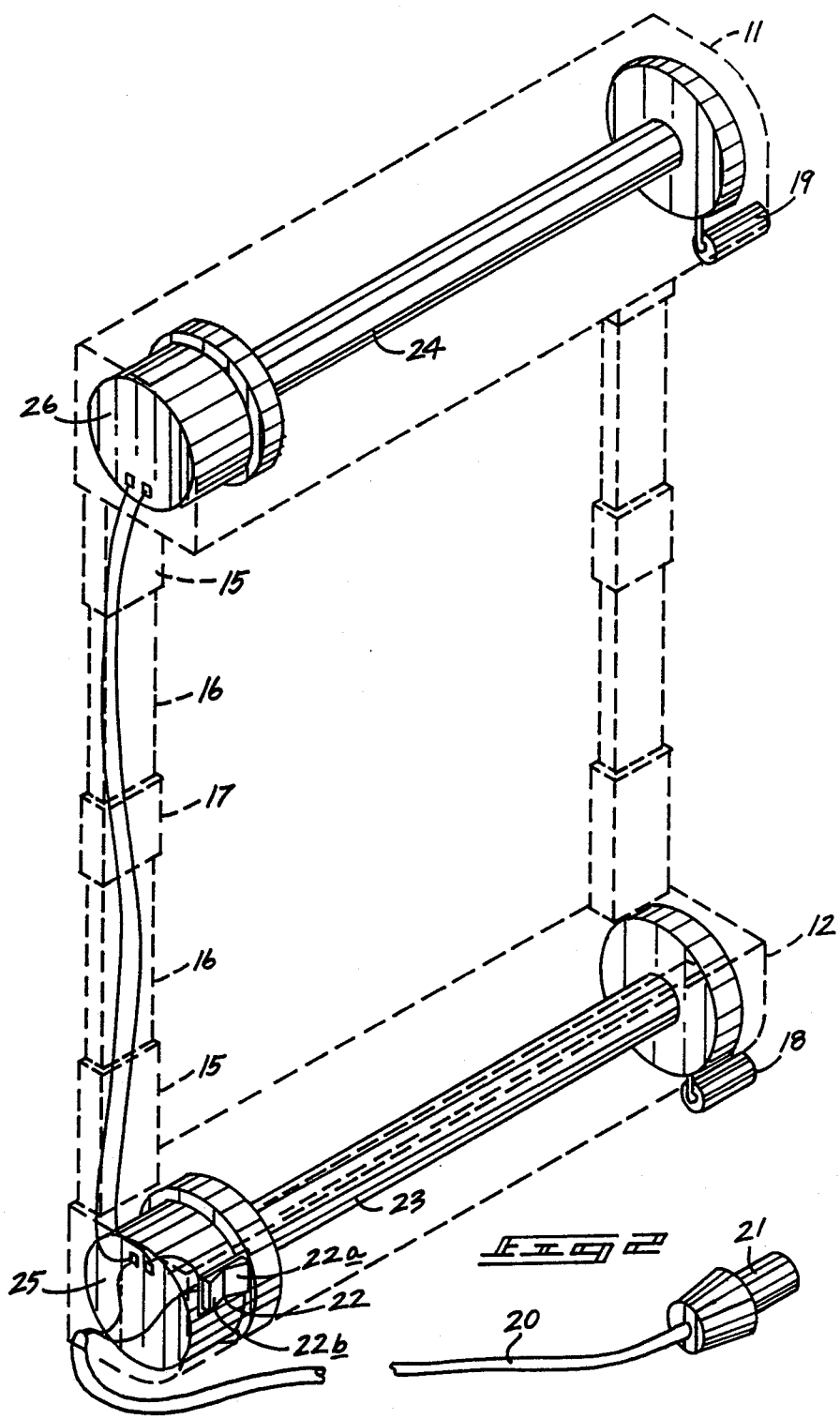

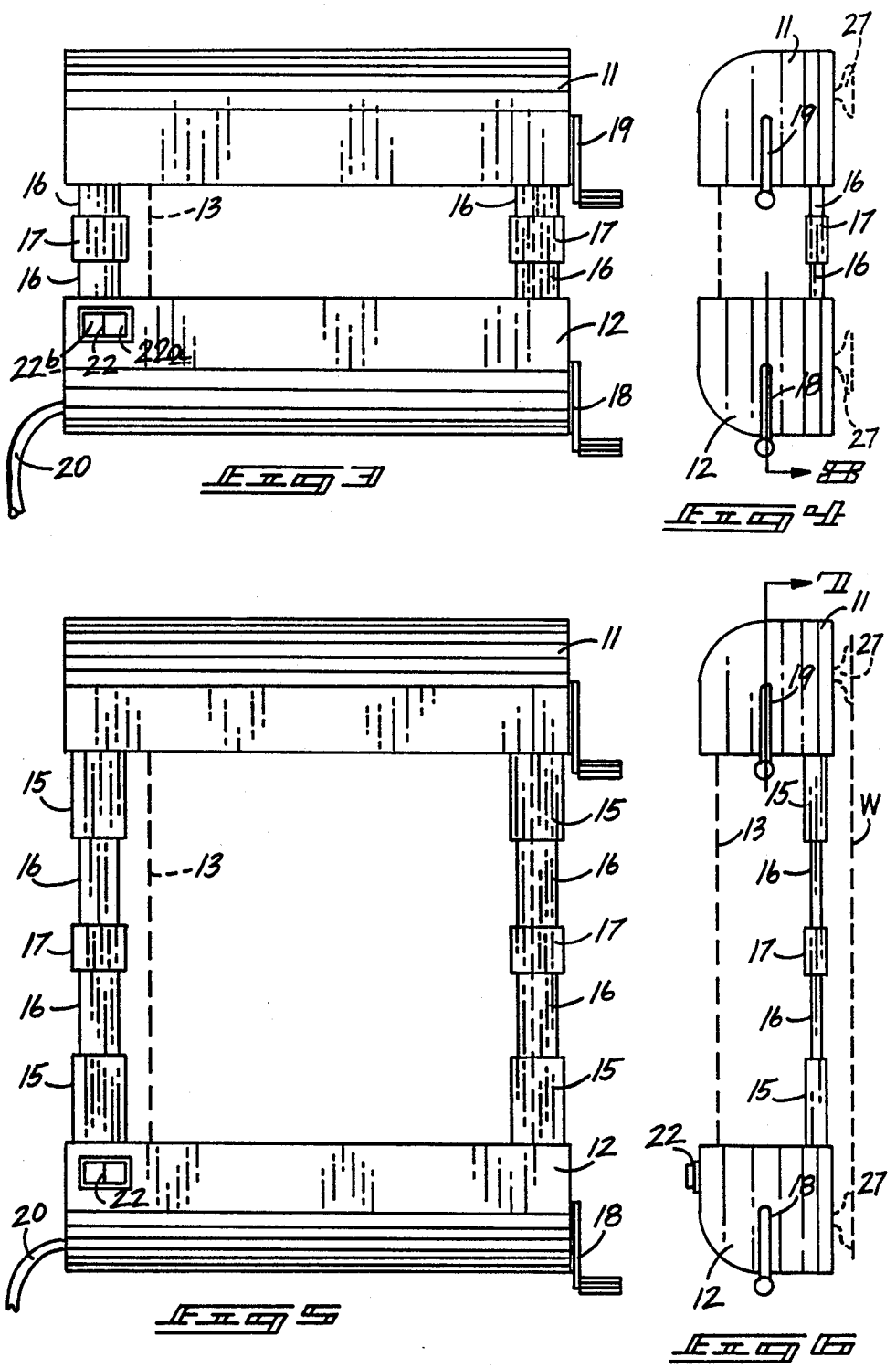

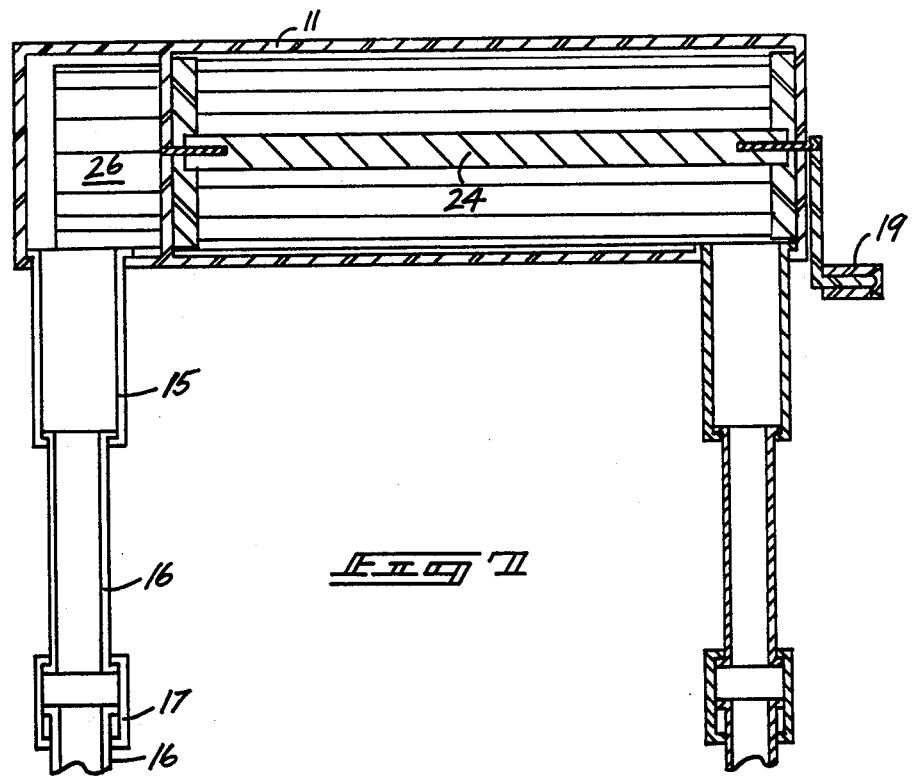
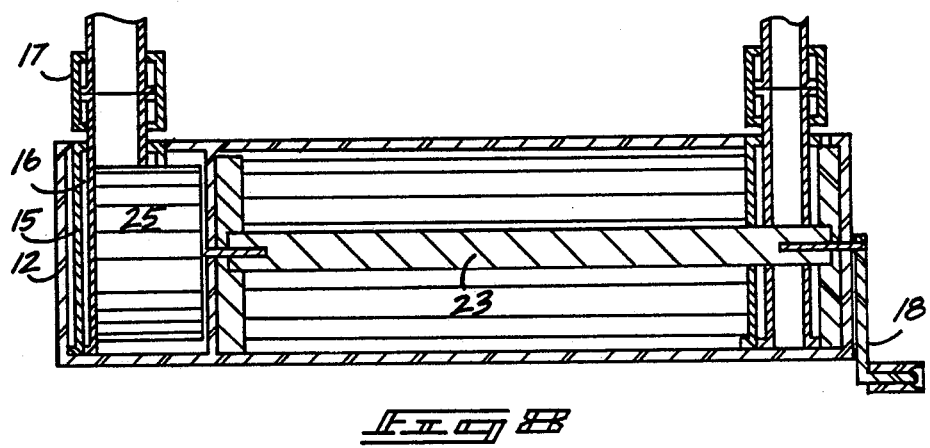

MAP HOLDER

BACKGROUND OF THE INVENTION

1. Field of the Invention

The present invention relates to map holding devices, and more particularly pertains to a new and improved map holder device which, when not being utilized, may be collapsed into a compact portable size for transport or storage and when needed, may be extended for enhanced viewing of various portions of an included map.

2. Description of the Prior Art

The use of map holding devices is well known in the prior art. As may be appreciated, these devices usually require a substantial amount of space and as such it is desirable to store the devices when they are not being utilized. Furthermore, prior art map holding apparatus has failed to include mechanized means for presentation of various parts of maps included therein and particularly in automotive situations has extended the attention time required to utilize such devices. For example, U.S. Pat. No. 1,773,337 to Barlow utilizes a map holding apparatus securable by a clamping arrangement about a steering wheel column of an associated automobile. A rearwardly positioned light illuminates the associated map wherein an included magnifying lens enhances viewing of a relatively small map. As may be appreciated, the Barlow map holder is relatively inconvenient in use and elaborate in construction relative to the instant invention.

U.S. Pat. No. 729,847 to Collamore utilizes a perimeter framework and cabinet-like structure wherein an elongate map may be rolled from one reel to the other and a series of illumination bulbs is utilized for lighting of the associated cabinetry. The Collamore patent, while an effective solution for chart-table reading of maps, is inconvenient and potentially dangerous in automotive environment requiring extensive attention to the working of the mechanism and is of a structure not subject to storage in a limited space environment, as in an automobile.

U.S. Pat. No. 2,501,840 to Bradford illustrates another fixed framework housing a plurality of spindles manually manipulatable for presenting various parts of spindle-mounted maps. An extensive illumination device along the casing is manipulatable for presenting light to the various portions of the map and is housed within a curvilinear structure for positioning proximate a forward windshield in an automobile. The Bradford patent, while of interest relative to the basic teaching of holding and presenting spindle-mounted maps, is of organization relatively remote in use to the instant invention.

U.S. Pat. No. 2,787,070 to Idoine sets forth a map holder apparatus wherein a battery powered illumination device is secured underlying a casing within included magnifying glass slidably positionable over the casing for the reading of various map portions of a spindle-mounted map organization. The relative size and utilization of the Idoine patent is of a structure removed from that of the instant invention requiring a greater degree of attention and scrutiny of an included map.

U.S. Pat. No. 4,283,869 to Rappa sets forth a portable chart holder and table wherein two rigid flat and transparent members secured together by manually operable security means includes a release mechanism for the securement and reading of an included map. The Rappa patent is of an organization and structure remote from that of the instant invention but is of interest relative to the transparent positioning of a map for viewing, such as in a sailing environment.

As such it may be appreciated that there is a continuing need for a new and improved map holder apparatus which addresses both the problem of storage and effectiveness, and in this respect the present invention substantially fulfills this need.

SUMMARY OF THE INVENTION

In view of the foregoing disadvantages inherent in the known types of map holder apparatus now present in the prior art, the present invention provides an map holder apparatus wherein the same may be compactly stored when not in use and may be further easily and efficiently extended and secured in an automotive environment during periods of need. As such, the general purpose of the present invention, which will be described subsequently in greater detail, is to provide a new and improved map holder which has all the advantages of the prior art map holders and none of the disadvantages.

To attain this, the present invention comprises a map holder apparatus which may be compactly telescopingly retracted during periods of non-use. An upper and lower casing respectively secure respective spindle means for securement of terminal ends of an elongate map wherein each spindle may be rotated to present various portions of the included map and may be manually or by use of associated motor means actuated to present various portions of the map. The apparatus includes suction means for securement of the apparatus in conjunction with an automotive window to provide enhanced illumination and ease of storage of the apparatus.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved map holder which has all the advantages of the prior art map holder and none of the disadvantages.

It is another object of the present invention to provide a new and improved map holder which may be easily and efficiently manufactured and marketed.

It is a further object of the present invention to provide a new and improved map holder which is of a durable and reliable construction.

An even further object of the present invention is to provide a new and improved map holder which is susceptible of a low cost of manufacture with regard to both materials and labor, and which accordingly is then susceptible of low prices of sale to the consuming public, thereby making such map holders economically available to the buying public.

Still yet another object of the present invention is to provide a new and improved map holder which provides in the apparatuses and methods of the prior art some of the advantages thereof, while simultaneously overcoming some of the disadvantages normally associated therewith.

Still another object of the present invention is to provide a new and improved map holder wherein the same may be compactly and telescopingly arranged for compact storage in transport.

Yet another object of the present invention is to provide a new and improved map holder wherein a plurality of casings secure a light plurality of spindles which in turn may be either manually or by motor means rotated for positioning of various portions of an associated map.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention illustrating the various spindles, their positioning, and relationship.

FIG. 3 is an orthographic illustration taken in elevation illustrating the instant invention in a retracted orientation.

FIG. 4 is an orthographic side view of FIG. 3 taken in elevation of the instant invention.

FIG. 5 is an orthographic view taken in elevation of the instant invention in an extended orientation.

FIG. 6 is an orthographic side view of FIG. 5 taken in elevation of the instant invention.

FIG. 7 is an orthographic partial sectional view taken along the section line 7 of FIG. 6 in the direction indicated illustrating the apparatus in an extended orientation.

FIG. 8 is an orthographic partial sectional view taken along the section line 8 of FIG. 4 in the direction indicated illustrating the apparatus in a retracted orientation.

DESCRIPTION OF THE PREFERRED EMBODIMENT

With reference now to the drawings, and in particular to FIGS. 1 to 8 thereof, a new and improved map holder embodying the principles and concepts of the present invention and generally designated by the reference numeral 10 will be described.

More specifically, it will be noted that the map holder apparatus 10 essentially comprises an upper casing 11 overlying a lower casing 12. A map 13 is rotatably mounted at each end within respective casings 11 and 12 upon individually rotatable spindles illustrated in FIGS. 2, 7 and 8. Elongate rectangular openings 14 are formed at a forward orientation upon facing surfaces of the respective upper and lower casings (only a lower opening 14 is illustrated within casing 12 but is a mirror image of that positioned within the confronting face of upper casing 11).

Upper and lower casings 11 and 12 are reciprocatably positionable relative to one another by means of the respective telescoping spaced members presented as pairs of outer legs 15 telescopingly positionable within each respective casing with respective pairs of inner legs 16 slidingly secured together by a coupling 17 to enable positioning of casing 11 and 12 relative to one another, as illustrated in FIGS. 3 through 6.

Each casing has formed extending outwardly laterally therefrom a manually manipulatable handle illustrated as lower handle 18 operatively associated with a lower map spindle 23 and an upper manually manipulatable handle 19 operatively associated with a respective upper map spindle 24. Also positioned at the other end of each respective spindle 23 and 24 respectively is a lower map motor 25 associated with lower spindle 23 and an upper map motor 26 associated with upper spindle 24. The respective motors 25 and 26 are operative by means of three-way switch 22 that upon engaging first directional face 22a will simultaneously operate motors 25 and 26 to feed an associated map 13 in the first direction whereupon depressing of second control face 22b reverses the direction to feed the map in the reverse direction. The switch 22, as illustrated, is in the neutral or non-actuating position.

Power for the respective motors is provided through power supply cord 20 formed with a cigarette lighter adaptor 21 at a terminal end for engagement within a respective cigarette lighter socket, as available in a conventional automobile.

Positioning of the map holder apparatus 10 is effected through the plurality of suction cups 27 positioned on rear surfaces of the upper and lower casings 11 and 12 respectively wherein at least a plurality of such cups are utilized with each casing face. As illustrated in FIG. 6, the suctions cups are oriented for engagement with an associated window "W" of a conventional automobile whereupon light entering through window "W" will be directed through a rear surface of map 13 to illuminate the associated map during daylight to enable enhanced viewing of the map areas.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A map holder apparatus comprising an upper and lower casing means for the rotatable securement of a map therebetween;

said upper casing means rotatably securing a first end of said map about a first spindle and said lower casing means rotatably securing a second end of said map about a second spindle, and said first and second spindles selectively spaced and parallel to one another to enable presentation of a portion of said map therebetween, and telescoping means associated with each casing means for selectively spacing said upper and lower casings relative to one another, and wherein said first spindle includes a manually manipulatable first handle integrally secured at one end thereof and a second handle integrally secured to a first end of said second spindle, and first motor means secured to said first spindle at the other end thereof and a second motor means secured to the other end of said second spindle wherein said first and second spindles are selectively rotatable either by manual manipulation of said first and second handles or selectively by actuation of said first and second motor means, and wherein three-way switch is secured to one of said casings to enable actuation of said first and second motor means, and wherein said three-way switch is formed with a first position for non-actuation of said motor means with a second position for rotation of said motor means in a first direction and a third position for rotation of said motor means in a second direction, and wherein a power cord formed with a cigarette lighter adaptor is operably secured to said switch for positioning within an automotive cigarette lighter socket to provide power for each of said motor means, and wherein a plurality of suction means are secured to a rearward face of said upper and lower casings for operative engagement with a window, and wherein said telescoping means includes a pair of spaced telescoping portions positioned proximate each terminal end of said upper and lower casing means respectively, and wherein said telescoping portions includes a plurality of outer legs positionable within said upper and lower casing and an inner leg telescopingly secured to each outer leg and a coupling member securing said inner legs together.

* * * * *